United States Patent
Liu et al.

(10) Patent No.: US 11,970,581 B2
(45) Date of Patent: Apr. 30, 2024

(54) FUNCTIONALIZED HYDROGENATED INTERPOLYMER WITH NON-HYDROGENATED SEGMENT

(71) Applicant: Bridgestone Corporation, Chuo-ku (JP)

(72) Inventors: Yuan Liu, Akron, OH (US); Ryan Hue, Akron, OH (US); Laura S. Kocsis, Akron, OH (US); Walter A. Salamant, Akron, OH (US); Jeffrey M. Magistrelli, Akron, OH (US)

(73) Assignee: Bridgestone Corporation, Chuo-ku (JP)

( * ) Notice: Subject to any disclaimer, the term of this patent is extended or adjusted under 35 U.S.C. 154(b) by 0 days.

(21) Appl. No.: 18/259,919

(22) PCT Filed: Dec. 29, 2021

(86) PCT No.: PCT/US2021/065556
§ 371 (c)(1),
(2) Date: Jun. 29, 2023

(87) PCT Pub. No.: WO2022/147159
PCT Pub. Date: Jul. 7, 2022

(65) Prior Publication Data
US 2024/0034839 A1    Feb. 1, 2024

Related U.S. Application Data

(60) Provisional application No. 63/132,592, filed on Dec. 31, 2020.

(51) Int. Cl.
| | | |
|---|---|---|
| C08G 77/18 | (2006.01) |
| B60C 1/00 | (2006.01) |
| C08C 19/02 | (2006.01) |
| C08C 19/25 | (2006.01) |
| C08F 4/48 | (2006.01) |
| C08F 12/08 | (2006.01) |
| C08F 136/06 | (2006.01) |
| C08F 236/06 | (2006.01) |
| C08K 3/36 | (2006.01) |
| C08L 9/00 | (2006.01) |
| C08L 15/00 | (2006.01) |

(52) U.S. Cl.
CPC ............... *C08G 77/18* (2013.01); *C08K 3/36* (2013.01)

(58) Field of Classification Search
CPC . B60C 1/00; C08C 19/02; C08C 19/25; C08F 136/06; C08F 236/06; C08F 4/48; C08F 12/08; C08L 15/00; C08L 9/00; C08G 77/18; C08K 3/36
USPC ......................................................... 524/588
See application file for complete search history.

(56) References Cited

U.S. PATENT DOCUMENTS

| | | | | |
|---|---|---|---|---|
| 2009/0312449 A1* | 12/2009 | Sasaki | ..................... | A43B 13/04 525/98 |
| 2017/0233561 A1* | 8/2017 | Sawada | ................. | B60C 1/0025 524/525 |
| 2018/0251576 A1* | 9/2018 | Adachi | ................. | B60C 1/0025 |

FOREIGN PATENT DOCUMENTS

| | | |
|---|---|---|
| JP | 2020510111 A | 4/2020 |
| JP | 7188361 B2 | 12/2022 |
| WO | 0077095 A1 | 12/2000 |
| WO | 2015084436 A1 | 6/2015 |
| WO | 2017047451 A1 | 3/2017 |

OTHER PUBLICATIONS

PCT Search Report and Written Opinion dated Apr. 25, 2022 in connection with PCT Application No. PCT/US2021/065556.
Japanese Office Action dated Dec. 19, 2023 in connection with Application Serial No. 2023-539090.

* cited by examiner

*Primary Examiner* — Kelechi C Egwim
(74) *Attorney, Agent, or Firm* — Meredith E. Hooker; Nathan T. Lewis

(57) ABSTRACT

A functionalized macromolecule includes a hydrogenated interpolymer portion, a non-hydrogenated polymer portion, and the radical of a functional coupling agent covalently bonded to and linking those portions. The functional group of the coupling agent exhibits interactivity with silica. The interpolymer can include vinyl aromatic mer and conjugated diene mer, with at least some of the latter, typically at least 50 mole percent, having been hydrogenated.

20 Claims, No Drawings

FUNCTIONALIZED HYDROGENATED INTERPOLYMER WITH NON-HYDROGENATED SEGMENT

CROSS-REFERENCE TO RELATED APPLICATION

This application is a National Phase entry application of International Patent Application No. PCT/US2021/065556, filed Dec. 29, 2021, published as WO 2022/147159, which, in turn, claims the benefit of priority of U.S. provisional patent appl. No. 63/132,592, filed 31 Dec. 2020. Each of these prior applications are incorporated herein by reference in their entirety.

BACKGROUND INFORMATION

Rubber goods such as tire components (e.g., treads, sidewalls, etc.) often are made from elastomeric compositions that contain one or more reinforcing materials such as, for example, particulate carbon black and silica; see, e.g., *The Vanderbilt Rubber Handbook*, 13th ed. (1990), pp. 603-04. Some of the most commonly employed synthetic elastomeric materials used in the manufacture of vulcanizates such as tire components include high-cis polybutadiene (BR), often made by processes employing catalysts, and substantially random styrene/butadiene interpolymers (SBR), often made by processes employing anionic initiators.

Good traction and resistance to abrasion are primary considerations for tire treads, however, motor vehicle fuel efficiency concerns argue for a minimization in their rolling resistance, which correlates with a reduction in hysteresis and heat build-up during operation of the tire. These considerations are, to a great extent, competing and somewhat contradictory: treads made from compositions designed to provide good road traction usually exhibit increased rolling resistance and vice versa.

Filler(s), polymer(s), and additives typically are chosen so as to provide an acceptable compromise or balance of desired properties. Ensuring that reinforcing filler(s) are well dispersed throughout the elastomeric material(s) both enhances processability and acts to improve physical properties. Dispersion of filler particles can be improved by increasing their interaction with the elastomer(s) and/or decreasing their interaction with each other. Examples of efforts of this type include high temperature mixing in the presence of selectively reactive promoters, surface oxidation of compounding materials, and surface grafting.

The section of a polymer chain from the site of the last crosslink to a terminus is not tied to the macromolecular network and thus cannot be involved in an efficient elastic recovery process. As a result, energy transmitted to this section of the polymer (and vulcanizate in which such polymer is incorporated) is lost as heat. Ensuring that these termini are tied to, or otherwise interact well with, reinforcing particulate fillers, is important to many vulcanizate physical properties such as, for example, reduced hysteresis.

Chemically modifying the polymer, typically at a terminus thereof, is one of the most effective ways of increasing interactivity of fillers and polymers. Terminal chemical modification often occurs by reaction of a living polymer with a functional terminating agent; see, e.g., U.S. Pat. Nos. 3,109,871, 4,647,625, 4,677,153, 5,109,907, 6,977,281, etc., as well as references cited therein and later publications citing these patents. Post-polymerization terminal functionalization that can be performed with anionically initiated polymers often cannot be performed on coordination catalyzed polymers and, to a lesser extent, vice versa.

Interest in hydrogenated polymers as components in rubber compositions continues to grow. These include hydrogenated BR (H-BR) and hydrogenated SBR (H-SBR). The latter typically exhibits improved tensile properties relative to an otherwise equivalent SBR, particularly when the degree of hydrogenation exceeds ~90%. (The degree of hydrogenation cannot be 100%, however, because some residual unsaturation must remain to participate in crosslinking reactions (vulcanization).)

Some limitations on the use of H-SBR have become apparent, however. When the degree of hydrogenation exceeds ~0.90%, so few potential crosslinking sites remain that the H-SBR can exhibit a different rate of cure than so-called bulk rubbers (e.g., SBR, BR, NR, etc.) with which it might be blended. Hydrogenation also impacts the polymer's solubility parameter, which can lead to immiscibility with other unsaturated polymers in a given rubber composition.

That which remains desirable is H-SBR which, when blended with one or more bulk rubbers, exhibits satisfactory miscibility and an acceptably comparable cure rate. Preferably, compositions containing that H-SBR can provide vulcanizates equivalent or superior tensile properties relative to vulcanizates made from otherwise equivalent compositions which do not contain that H-SBR.

SUMMARY

Provided herein is a functionalized macromolecule that includes a hydrogenated interpolymer portion, a non-hydrogenated polymer portion, and the radical of a functional coupling agent covalently bonded to each of said portions. The functional group resulting from attachment of the coupling agent exhibits interactivity with silica.

The interpolymer advantageously can include vinyl aromatic mer and conjugated diene mer, with at least some of the latter having been hydrogenated, i.e., some of the residual unsaturation resulting from incorporation of such mer has been lost as a result of the polymer having been subjected to conditions whereby $H_2$ can add across some of its double bonds. Relative to the total number of conjugated diene mer incorporated in the interpolymer, those which are hydrogenated, i.e., no longer include ethylenic unsaturation, typically constitute at least 50 mole percent, and preferably significantly higher, e.g., at least ~80 mole percent.

In some embodiments, the interpolymer can include from 10 to 45 mole percent vinyl aromatic mer. In these and other embodiments, the interpolymer can have a significant percentage of its conjugated diene mer incorporated in a 1,2-vinyl configuration, e.g., at least 30 mole percent.

The non-hydrogenated polymer portion(s) of the macromolecule includes conjugated diene mer and, in some embodiments, consists of such mer. In embodiments where the non-hydrogenated polymer portion(s) consists of conjugated diene mer, that portion can have a number average molecular weight ($M_n$) of up to ~50 kg/mol, often of from 10 to 40 kg/mol.

The radical covalently bonded to both polymer portions can be the residue of a coupling agent that includes a functional group that is reactive toward carbanions, includes a functional group capable of interacting with silica, and does not react or degrade when subjected to hydrogenation conditions. In some embodiments, the functional coupling agent can include an epoxy group and a siloxy group.

Also provided is a method for providing the aforedescribed functionalized macromolecule. An interpolymer that includes vinyl aromatic mer, conjugated diene mer, and terminal functionality resulting from the incorporated coupling agent is subjected to conditions whereby some, preferably at least half, of its conjugated diene mer are hydrogenated. The interpolymer is introduced to, or has introduced to it, carbanionic polymers that include conjugated diene mer, and the latter reacts with the radical of the coupling agent previously covalently bonded solely to the interpolymer. From 0.5 to 10 equivalents of the second type of polymer can be employed per equivalent of the interpolymer. The result is a macromolecule that includes portions resulting from both polymers.

Regardless of how characterized, the macromolecule can interact with particulate fillers, particularly silica. Compositions, that include particulate fillers and the functionalized macromolecule also are provided, as are methods of providing and using such compositions.

The compositions can include other elastomers. Advantageously, the functionalized macromolecule can exhibit improved miscibility with certain bulk rubbers commonly employed in rubber compositions, particularly BR, as well as desirable tensile properties in vulcanizates provided therefrom.

Other aspects of the present invention will be apparent to the ordinarily skilled artisan from the detailed description that follows. To assist in understanding that description, certain definitions are provided immediately below, and these are intended to apply throughout unless the surrounding text explicitly indicates a contrary intention:

"polymer" means the polymerization product of one or more monomers and is inclusive of homo-, co-, ter-, tetra-polymers, etc.;

"mer" or "mer unit" means that portion of a polymer derived from a single reactant molecule (e.g., ethylene mer has the general formula —$CH_2CH_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetrapolymers, and the like;

"random interpolymer" means an interpolymer having mer units derived from each type of constituent monomer incorporated in an essentially non-repeating manner and being substantially free of blocks, i.e., segments of three or more of the same mer;

"gum Mooney viscosity" is the Mooney viscosity of an uncured polymer prior to addition of any filler(s);

"substituted" means one containing a heteroatom or functionality (e.g., hydrocarbyl group) that does not interfere with the intended purpose of the group in question;

"directly bonded" means covalently attached with no intervening atoms or groups;

"polyene" means a molecule with at least two double bonds located in the longest portion or chain thereof, and specifically is inclusive of dienes, trienes, and the like;

"polydiene" means a polymer that includes mer units from one or more dienes;

"microstructure" means an individual characteristic, or the totality of all such characteristics, relating to the manner in which polyene mer incorporates into a polymer chain and is inclusive of 1,4-content, 1,2-(vinyl) content, cis content, and trans content;

"phr" means parts by weight (pbw) per 100 pbw rubber;

"radical" or "residue" means the portion of a molecule that remains after reacting with another molecule, regardless of whether any atoms are gained or lost as a result of the reaction;

"terminus" means an end of a polymeric chain;

"terminal moiety" means a group or functionality located at a terminus; and

"reactive polymer" means a polymer having at least one site which, because of the presence of an active terminus, readily reacts with other molecules, with the term being inclusive of, inter alia, carbanionic polymers.

Hereinthroughout, all values given in the form of percentages are weight percentages (w/w) unless the surrounding text explicitly indicates a contrary intention.

Unless the text surrounding them indicates otherwise, all numbers expressing quantities of ingredients, process conditions (e.g., time and temperature), and the like are to be understood as being modified in all instances by the term "about." Recited numerical limitations include an appropriate degree of precision based on the number of significant places used, for example, "up to 5.0" can be read as setting a lower absolute ceiling than "up to 5."

All publications, patent applications, patents, and other references mentioned herein are incorporated by reference in their entirety as though fully set forth herein.

DETAILED DESCRIPTION OF ILLUSTRATIVE EMBODIMENTS

The interpolymer portion of the macromolecule is described first, followed by the second polymer portion and then the coupling of the two polymer portions to form the macromolecule.

The interpolymer includes unsaturation resulting from incorporation of polyenes, particularly dienes and trienes (e.g., myrcene). Preferred are $C_4$-$C_{12}$ conjugated dienes such as, but not limited to, 1,3-butadiene, isoprene, 1,3-pentadiene, 2,3-dimethyl-1,3-butadiene, and 1,3-hexadiene.

Polyenes can incorporate into polymeric chains in more than one way. A polymer chain with an overall 1,2-(vinyl) microstructure, given as a numerical percentage based on total polyene content, of from ~10 to ~80%, or from ~25 to ~65%, can be desirable in some embodiments. Substantially linear polymers are those that, based on total polyene content, have an overall 1,2-microstructure of no more than ~50%, preferably no more than ~45%, more preferably no more than ~40%, even more preferably no more than ~35%, and most preferably no more than ~30%. For certain end use applications, keeping the content of 1,2-linkages even lower, e.g., to less than ~7%, less than 5%, less than 2%, or less than 1%, can be desirable. Controlling the initial vinyl content may maintain the amorphous nature of the interpolymer, thereby reducing crystallinity that can degrade performance of vulcanizates made from rubber compounds including the macromolecule (Vinyl content, as well as other microstructure details can be determined by, for example, proton NMR.)

Pendent aromatic groups can be provided through incorporation of vinyl aromatic mer units, particularly $C_8$-$C_{20}$ vinyl aromatics such as, e.g., styrene, α-methyl styrene, p-methyl styrene, the vinyl toluenes, and the vinyl naphthalenes. When used in conjunction with one or more polyenes, mer units with pendent aromaticity can constitute up to ~60%, from ~1 to ~50%, from ~10 to ~45%, from ~20 to ~35%, or even from ~25 to ~30% of the total number of mer units in the polymer chain.

The various types of mer in the interpolymer preferably incorporate randomly, which means that each type of mer does not form blocks and, instead, is incorporated in a substantially non-repeating manner. Random microstructure can provide particular benefit in some end use applications such as, e.g., rubber compositions used in the manufacture of tire treads.

Exemplary interpolymers include those with mer derived from one or more polyenes and from styrene such as, e.g., poly(styrene-co-butadiene), also known as SBR.

Such interpolymers, particularly those made according to anionic techniques (described below) generally have a $M_n$ of up to ~500,000 Daltons. In certain embodiments, the $M_n$ advantageously can be at least ~10,000 Daltons or can range from ~50,000 to ~250,000 Daltons or from ~75,000 to ~150,000 Daltons A preferred range is ~75,000 to ~225,000 Daltons, particularly from ~100,000 to ~200,000 Daltons. Often, the $M_n$ is such that a quenched sample exhibits a gum Mooney viscosity ($ML_4/100°$ C.) of from ~2 to ~150, more commonly from ~2.5 to ~125, even more commonly from ~5 to ~100, and most commonly from ~10 to ~75.

The interpolymer can be made by any of a variety of polymerization techniques. Solution polymerization generally affords a higher degree of control with respect to such properties as randomness, microstructure, etc., although other techniques, e.g., emulsion polymerization, can be utilized. Solution polymerizations have been performed since about the mid-20th century, so the general aspects thereof are known to the ordinarily skilled artisan. Useful polymerization solvents include various $C_i$-$C_u$ cyclic and acyclic alkanes as well as their alkylated derivatives, certain liquid aromatic compounds, and mixtures thereof; ordinarily skilled artisans are aware of other useful solvent options and combinations.

Anionic (living) polymerizations involve an initiator as opposed to a catalyst. Exemplary initiators include organolithium compounds, particularly alkyllithium compounds. Examples of organolithium initiators include N-lithio-hexamethyleneimine; n-butyllithium; tributyltin lithium; dialkylaminolithium compounds such as dimethylaminolithium, diethylaminolithium, dipropylaminolithium, dibutylaminolithium and the like; dialkylaminoalkyllithium compounds such as diethylaminopropyllithium; and those trialkylstanyl lithium compounds involving $C_1$-$C_{12}$, preferably $C_1$-$C_4$, alkyl groups.

Multifunctional initiators, i.e., initiators capable of forming polymers with more than one living end, also can be used. Examples of multifunctional initiators include, but are not limited to, 1,4-dilithiobutane, 1,10-dilithiodecane, 1,20-dilithioeicosane, 1,4-dilithiobenizene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, and 4,4'-dilithiobiphenyl.

In addition to organolithium initiators, so-called functionalized initiators also can be useful. These become incorporated into the polymer chain, thus providing a functional group at the initiated end of the chain. Examples of such materials include lithiated aryl thioacetals (see, e.g., U.S. Pat. No. 7,153,919) and the reaction products of organolithium compounds and, for example, N-containing organic compounds such as substituted aldimines, ketimines, secondary amines, etc., optionally pre-reacted with a compound such as diisopropenyl benzene (see, e.g., U.S. Pat. Nos. 5,153,159 and 5,567,815). Use of a N atom-containing initiator such as, for example, lithiated HMI, can further enhance interactivity between the polymer chains and carbon black particles. See also, for example, U.S. Pat. Nos. 8,227,562, 8,871,871, 9,365,660, 10,277,425, 10,815,328, etc.

In solution polymerizations, both randomization and vinyl content (i.e., 1,2-microstructure) can be increased by including a coordinator, usually a polar compound, in the polymerization ingredients. Up to 90 or more equivalents of coordinator can be used per equivalent of initiator, with the amount depending on, e.g., the amount of vinyl content desired, the level of non-polyene monomer(s) employed, the reaction temperature, and nature of the specific coordinator employed. Compounds useful as coordinators include organic compounds that include a heteroatom having a non-bonded pair of electrons (e.g., 0 or N). Examples include dialkyl ethers of mono- and oligo-alkylene glycols; crown ethers; tertiary amines such as tetramethylethylene diamine; THF; THF oligomers; linear and cyclic oligomeric oxolanyl alkanes (see, e.g., U.S. Pat. No. 4,429,091) such as 2,2-bis(2'-tetrahydrofuryl)propane, di-piperidyl ethane, hexamethylphosphoramide, N,N'-dimethylpiperazine, diazabicyclooctane, diethyl ether, tributylamine, and the like.

Although ordinarily skilled artisans understand the conditions typically employed in anionically initiated polymerizations, a representative description is provided for convenience. The following is based on a batch process, although it can be extended to semi-batch, continuous, or other techniques.

A blend of monomers and solvent(s) can be charged to a suitable reaction vessel, followed by addition of a coordinator (if used) and initiator, which often are added as part of a solution or blend; alternatively, monomer(s) and coordinator can be added to the initiator. The reactants can be heated (typically no higher than ~150° C.) and agitated After introduction of the initiating compound, polymerization is allowed to proceed under anhydrous, anaerobic conditions for a period of time sufficient to result in the formation of the desired polymer, usually from ~0.01 to ~100 hours, more commonly from ~0.08 to ~48 hours, and typically from ~0.15 to ~2 hours.

After a desired degree of conversion has been reached, the heat source (if used) can be removed and, if the reaction vessel is to be reserved solely for polymerizations, the reaction mixture removed to a post-polymerization vessel for functionalization.

Interpolymers made according to anionic techniques have an active terminus (or at least two active termini if a multifunctional initiator is employed). If a polymerization technique which does not provide at least one active terminus is employed, at least some of the polymer chains will need to be rendered reactive so that functionalization can be undertaken.

Functionalization of an active terminus can provide a terminal moiety, preferably one directly bonded to the interpolymer. The terminal moiety provided should be (or include a functional group which is) reactive toward carbanions and should be (or include a functional group which is) capable of interaction with silica. Preferably, the terminal moiety also does not react or degrade when the interpolymer to which it is attached is subjected to hydrogenation conditions.

Using a terminally active interpolymer as an exemplary material, functionalization can be readily achieved by reaction with a compound capable of providing the aforedescribed terminal moiety. One non-limiting example of such a compound is one that includes both an epoxy group and a siloxy group. In some embodiments, the siloxy group can be a trialkoxysilane where the alkyl moieties include from 1 to 6 C atoms, preferably from 1 to 3 C atoms. Trimethoxysilanes am preferred. An exemplary functionalizing compound is 2-(3,4-epoxycyclohexyl)ethyltrimethoxysilane (ECETMOS).

If desired, the cement containing the functionalized interpolymer can be subjected to quenching in an appropriate active hydrogen atom-containing solvent. Additionally, it can be processed (dried, sheeted, etc.) and stored if hydrogenation is not to be performed on the polymer cement itself.

The functionalized interpolymer, while in an appropriate organic liquid and/or with additional organic liquid added thereto, is mixed with a hydrogenation catalyst, often one based on Ni (e.g., nickel octoate) alone or in combination with an Al-containing compound (e.g., an organoaluminum compound such as, for example, a trialkylaluminum), in the presence of a $H_2$ stream. The solvent can include one or more of the organic liquids mentioned previously. When the catalyst includes both Ni and Al, Al/Ni molar ratio can be from 1.1 to 5:1, preferably from 2:1 to 4:1, and most preferably 3:1±20% (i.e., from 2.4:1 to 3.6:1).

Pressurized $H_2$ can be introduced at ~0.1 to ~10 MPa (1 to 100 atm), commonly at ~0.25 to ~7.5 MPa (2.5 to 74 atm), and typically at ~0.5 to ~5 MPa (5 to 50 atm).

The extent of hydrogenation, meaning the mole percentage of polyene mer double bonds lost after the interpolymer is subjected to a hydrogenation process such as the one described above, as determined by $^1$H NMR spectroscopy can range from ~50 to close to 100%. Extents of hydrogenation of at least 80%, 84%, 88%, 92%, or 96% can be desirable in terms of certain mechanical properties of vulcanizates made from rubber compounds including the interpolymer.

Hydrogenation reduces the number of double bonds in both the primary chain and side chains of each polymer. The extent of hydrogenation of each type of unsaturation tends to be about equal.

If desired, the cement containing the hydrogenated, functionalized interpolymer can be processed (dried, sheeted, etc.) and stored if the interpolymer cement itself is not to be used in the reaction with the second type of polymer.

The second type of polymer has a terminal functionality and, accordingly, is provided by an anionically initiated polymerization, the general conditions of which have been described above The second type of polymer includes unsaturation resulting from incorporation of polyenes, particularly dienes and trienes (e.g., myrcene). Preferred are $C_4$-$C_{12}$ conjugated dienes such as, but not limited to, 1,3-butadiene, isoprene, 1,3-pentadiene, 2,3-dimethyl-1,3-butadiene, and 1,3-hexadiene. Other types of mer which can be incorporated include those resulting from mono-olefinic monomers such as the vinyl aromatic compounds described above and α-olefins (e.g., ethylene and propylene), as well as mixtures of the foregoing. The amount of monoolefinic mer generally is kept below 20%, commonly below 15%, typically below 10%, and most typically below 5%. Embodiments in which this polymer includes only polyene, particularly conjugated diene mer, are preferred and, among those, homopolymers are particularly preferred.

The second polymer typically is synthesized so as to have a molecular weight substantially lower than that of the previously described (hydrogenated) interpolymer. The $M_n$ of the second polymer usually is below 75,000, commonly from ~5000 to ~50,000, Daltons. Some embodiments exhibit a $M_n$ of from ~10,000 to ~20,000, particularly of from ~12,000 to ~15,000, Daltons, other embodiments display a $M_n$ of from ~30,000 to ~40,000 Daltons.

The microstructure of the second polymer can vary widely without significantly impacting the process in a negative manner.

The second polymer is not hydrogenated, functionalized or (intentionally) quenched so that it retains terminal activity.

When the two aforedescribed types of polymers are introduced, the latter reacts with the terminal functionality of the former. This reaction can be permitted to proceed for 10 to 600 minutes, typically 30 to 300 minutes, at a temperature of from ~0° to ~150° C., commonly from ~10° to ~100° C., and typically from ~20° to ~80° C. No catalysis is required, although maintenance of anaerobic and anhydrous conditions is preferred so as to maintain the activity of the carbanionic polymer chains.

As understood by ordinarily skilled artisans, the amounts of chains and the ratio of the two types of polymers can be used to control the coupling reaction. Assuming that the interpolymer was prepared using an anionic (e.g., n-BuLi) initiator and that all or almost all of its chains were functionalized, the ratio of Li employed in the two polymerizations can be used as a proxy for adjusting the amounts of the two types of polymers involved in the coupling reaction. The ratio of second-to-first polymers can range from 1:2 to 10:1, with ratios of 1:1 to 5:1 or even ~3:1 being more common.

Completion of this coupling reaction provides the macromolecule. Accordingly, the macromolecule includes a hydrogenated interpolymer portion, a non-hydrogenated polymer portion and, between the two polymer portions, a functional group covalently bonded to the two portions. The functional group exhibits interactivity toward silica fillers.

The macromolecule typically has a $M_n$ of from ~250,000 to ~600,000 Daltons, often from ~350,000 to ~550,000 Daltons.

The majority of conjugated diene mer in the overall macromolecule preferably are incorporated in a 1,2-(i.e., vinyl) configuration.

The macromolecule can be used as a component in vulcanizable compositions that include a wide variety of other polymers including without limitation natural or synthetic polyisoprene and homo- and interpolymers of polyenes, particularly dienes and most particularly conjugated dienes. It has found particular utility when used with BR having a 1,2-vinyl content of no more than 3% and cis-1,4 contents of at least 96% (in this paragraph, all percentages are molar, such percentages being determined by spectroscopic techniques.) When used with one or more polymers of this type, the macromolecule can be employed at a ratio of from 2:3 to 3:2, preferably 3:4 to 4:3, more preferably 4:5 to 5:4 and most preferably from 1:1 to 9:8.

Any other polymer which does not interfere with the ability of the resulting rubber composition to provide a vulcanizate having desired physical properties can be employed in appropriate amounts. Non-limiting examples include butyl rubber, neoprene, EPR, acrylonitrile/butadiene rubber, silicone rubber, fluoroelastomers, ethylene/acrylic rubber, EVA, epichlorohydrin rubbers, chlorinated polyethylene rubbers, chlorosulfonated polyethylene rubbers, hydrogenated nitrile rubber, tetrafluoroethyleneipropylene rubber, and the like.

Polymers of the types described above can be compounded with, inter alia, reinforcing fillers. Elastomeric compounds typically are filled to a volume fraction, which is the total volume of filler(s) added divided by the total volume of the elastomeric stock, often ~25%; typical (combined) amounts of reinforcing fillers range from ~30 to ~100 phr, with the upper end of the range being defined largely by how effectively processing equipment can handle the increased viscosities imparted when such fillers are employed.

Useful fillers include various forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 $m^2/g$, preferably at least about 35 $m^2/g$, are preferred; see ASTM D-1765 for methods of determining surface areas of carbon blacks. The carbon blacks may be in pelletized form or an unpelletized flocculent mass, although unpelletized carbon black can be preferred for use in certain mixers.

The amount of carbon black can be up to ~50 phr, with ~5 to ~40 phr being typical.

Amorphous silica ($SiO_2$) also can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, which can be observed by thin section microscopy.

Surface area gives a reliable measure of the reinforcing character of different silicas; the Brunauer, Emmet and Teller ("BET") method (described in *J. Am. Chem. Soc.*, vol. 60, p. 309 et seq.) is a recognized method for determining surface area. BET surface areas of silicas generally are less than 450 $m^2/g$, commonly from ~32 to ~400 $m^2/g$ or from ~100 to ~250 $m^2/g$ or from ~150 to ~220 $m^2/g$.

The pH of the silica filler (when used) is generally from ~5 to ~7 or slightly higher, preferably from ~5.5 to ~6.8.

When silica is employed, a coupling agent such as a silane often is added so as to ensure good mixing in, and interaction with, the elastomer(s). Generally, the amount of silane that is added ranges between about 4 and 20%, based on the weight of silica filler present in the elastomeric compound. Coupling agents can have a general formula of A-T-G, in which A represents a functional group capable of bonding physically and/or chemically with a group on the surface of the silica filler (e.g., surface silanol groups), T represents a hydrocarbon group linkage; and G represents a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583.245, 5,663,396, 5,684,171, 5,684,172, 5,696,197, etc.) or polyorganosiloxanes bearing the G and A functionalities mentioned above. Addition of a processing aid can be used to reduce the amount of silane employed; see, e.g., U.S. Pat. No. 6,525,118 for a description of fatty acid esters of sugars used as processing aids Additional fillers useful as processing aids include, but are not limited to, mineral fillers, such as clay (hydrous aluminum silicate), talc (hydrous magnesium silicate), and mica as well as non-mineral fillers such as urea and $Na_2SO_4$. Exemplary micas contain principally alumina, silica and potash, although other variants can be used. Additional fillers can be utilized in an amount of up to ~40 phr, typically up to ~20 phr.

Silica commonly is employed in amounts up to ~100 phr, typically in an amount from ~5 to ~80 phr. When carbon black also is present, the amount of silica can be decreased to as low as ~1 phr; as the amount of silica decreases, lesser amounts of the processing aids, plus silane if any, can be employed.

One or more non-conventional fillers having relatively high interfacial free energies, i.e., surface free energy in water values ($\gamma_{pl}$), can be used in conjunction with or in place of carbon black and/or silica. The term "relatively high" can be defined or characterized in a variety of ways such as, e.g., greater than that of the water-air interface, preferably several multiples (e.g., at least 2×, at least 3× or even at least 4×) of this value; at least several multiples (e.g., at least 2×, at least 3×, at least 4×, at least 5×, at least 6×, at least 7×, at least 8×, at least 9× or even at least 10×) of the $\gamma_{pl}$ value for amorphous silica; in absolute terms such as, e.g., at least ~300, at least ~400, at least ~500, at least ~600, at least ~700, at least ~750, at least ~1000, at least ~1500, and at least ~2000 $mJ/m^2$. Non-limiting examples of naturally occurring materials with relatively high interfacial free energies include F-apatite, goethite, hematite, zincite, tenorite, gibbsite, quartz, kaolinite, all forms of pyrite, and the like. Certain synthetic complex oxides also can exhibit this type of high interfacial free energy.

The foregoing types of materials typically are more dense than either carbon black or amorphous silica; thus, replacing a particular mass of carbon black or silica with an equal mass of a non-conventional filler typically will result in a much smaller volume of overall filler being present in a given compound. Accordingly, replacement typically is made on an equal volume, as opposed to equal weight, basis.

Other conventional rubber additives also can be added. These include, for example, process oils, plasticizers, anti-degradants such as antioxidants and antiozonants, curing agents and the like.

All ingredients can be mixed with standard equipment such as, e.g., Banbury or Brabender mixers. Typically, mixing occurs in two or more stages. During the first stage (often referred to as the masterbatch stage), mixing typically is begun at temperatures of ~0.120° to ~130° C. and increases until a so-called drop temperature, typically ~165° C., is reached.

Where a formulation includes fillers other than or in addition to carbon black, a separate re-mill stage often is employed for separate addition of the silane component(s). This stage often is performed at temperatures similar to, although often slightly lower than, those employed in the masterbatch stage, i.e., ramping from ~90° C. to a drop temperature of ~150° C.

Reinforced rubber compounds conventionally are cured with ~0.2 to ~5 phr of one or more known vulcanizing agents such as, for example, sulfur or peroxide-based curing systems. For a general disclosure of suitable vulcanizing agents, the interested reader is directed to an overview such as that provided in Kirk-Othmer, *Encyclopedia of Chem. Tech.*, 3d ed., (Wiley Interscience, New York, 1982), vol. 20, pp. 365-468. Vulcanizing agents, accelerators, etc., are added at a final mixing stage. To reduce the chances of undesirable scorching and/or premature onset of vulcanization, this mixing step often is done at lower temperatures, e.g., starting at ~60° to ~65° C. and not going higher than ~105° to ~110° C.

Subsequently, the compounded mixture is processed (e.g., milled) into sheets prior to being formed into any of a variety of components and then vulcanized, which typically occurs at ~5° to ~15° C. higher than the highest temperatures employed during the mixing stages, most commonly about 170° C.

As is evident from the foregoing, general preferences regarding features, ranges, numerical limitations and embodiments are to the extent feasible, as long as not interfering or incompatible, envisioned as being capable of being combined with other such generally preferred features, ranges, and numerical limitations. The following enumerated embodiments are provided to assist in envisioning a few of such combinations.

Process Embodiments

P1. A process for providing a functionalized macromolecule that comprises hydrogenated interpolymer and non-hydrogenated polymer portions, said process comprising:
  a) providing a terminally functionalized interpolymer that comprises vinyl aromatic mer, conjugated diene mer, hydrogenated products of conjugated diene mer, and a terminal functionality which is reactive toward carbanions and comprises a functional group capable of interacting with silica,
  b) introducing said interpolymer to, or introducing to said interpolymer, a carbanionic polymer that comprises conjugated diene mer; and
  c) allowing said carbanionic polymer to react with said terminal functionality so as to provide said functionalized macromolecule.

P2. The process of P1 wherein said interpolymer is provided by subjecting a terminally functionalized polymer that comprises vinyl aromatic mer and conjugated diene mer to hydrogenation conditions so as to hydrogenate at least 50 mole percent of said conjugated diene mer.

P3. The process of P2 wherein said terminally functionalized polymer is provided by reacting a carbanionic interpolymer that comprises vinyl aromatic mer and conjugated diene mer with a compound capable of coupling polymer chains, said compound comprising a silica interactive functional group and being unreactive and resistant to degradation when subjected to hydrogenation conditions.

P4. The process of P3 wherein said compound comprises an epoxy group and a siloxy group.

P5. The process of P4 wherein said compound is a 2-(3,4-epoxycyclohexyl)ethyltrialkoxysilane.

P6. The process of P5 wherein the alkoxy moieties of said compound are methoxy moieties.

P7 The process of P1 wherein at least 80 mole percent of said conjugated diene mer in said interpolymer have been hydrogenated.

P8. The process of P7 wherein at least 90 mole percent of said conjugated diene mer in said interpolymer have been hydrogenated.

P9. The process of any of P1 to P8 wherein said interpolymer comprises from 10 to 45 mole percent styrene mer.

P10. The process of any of P1 to P9 wherein a majority of said conjugated diene mer are incorporated in a 1,2-vinyl configuration.

P11. The process of any of P1 to P10 wherein said carbanionic polymer consists of conjugated diene mer.

P12. The process of any of P1 to P11 wherein from 0.5 to 10 equivalents of said carbanionic polymer are reacted per equivalent of said interpolymer.

P13. The process of any of P1 to P12 wherein said carbanionic polymer has a number average molecular weight of from 5 to 50 kg/mol.

P14. The process of P13 wherein said carbanionic polymer has a number average molecular weight of from 10 to 20 kg/mol.

P15. The process of P13 wherein said carbanionic polymer has a number average molecular weight of from 30 to 40 kg/mol.

Macromolecule Embodiments

M1. A functionalized macromolecule comprising a hydrogenated interpolymer portion, a non-hydrogenated polymer portion, and a functional group covalently bonded to each of said portions, said functional group exhibiting interactivity with silica.

M2. The functionalized macromolecule of M1 wherein said functional group is the radical of a compound that comprises an epoxy group and a siloxy group.

M3. The functionalized macromolecule of M18 wherein said compound is a 2-(3,4-epoxycyclohexyl)ethyltrialkoxysilane.

M4. The functionalized macromolecule of M19 wherein the alkoxy moieties of said compound are methoxy moieties M5. The functionalized macromolecule of any of M1 to M4 wherein said interpolymer comprises vinyl aromatic mer and conjugated diene mer.

M6. The functionalized macromolecule of M5 wherein said interpolymer consists of vinyl aromatic mer and conjugated diene mer.

M7. The functionalized macromolecule of M5 or M6 wherein at least 80 mole percent of said conjugated diene mer in said interpolymer have been hydrogenated.

M8. The functionalized macromolecule of M7 wherein at least 90 mole percent of said conjugated diene mer in said interpolymer have been hydrogenated.

M9. The functionalized macromolecule of any of M5 to M8 wherein said interpolymer comprises from 10 to 45 mole percent styrene.

M10. The functionalized macromolecule of M5 to M9 wherein a majority of said conjugated diene mer are incorporated in a 1,2-vinyl configuration.

M11. The functionalized macromolecule of any of M1 to M10 wherein said non-hydrogenated polymer portion comprises conjugated diene mer.

M12. The functionalized macromolecule of M11 wherein said non-hydrogenated polymer portion consists of conjugated diene mer.

M13. The functionalized macromolecule of any of M1 to M12 wherein said macromolecule comprises multiple non-hydrogenated polymer portions.

M14. The functionalized macromolecule of any of M1 to M12 wherein said non-hydrogenated polymer portion results from a conjugated diene homopolymer having a number average molecular weight of from 5 to 50 kg/mol.

M15. The functionalized macromolecule of M14 wherein said conjugated diene homopolymer has a number average molecular weight of from 10 to 20 kg/mol or from 30 to 40 kg/mol.

Rubber Compound Embodiments

R1. A composition comprising the functionalized macromolecule of any of M1 to M15 and at least one bulk rubber.

R2. The composition of R1 wherein said at least one bulk rubber comprises polybutadiene.

R3. The composition of R2 wherein said at least one bulk rubber is polybutadiene.

R4. The composition of R2 or R3 wherein said polybutadiene has at least 90% of its mer in a cis configuration R5. The composition of any of R1 to R4 further comprising particulate fillers which comprise silica.

R6. The composition of any of R1 to R5 further comprising a heat activated crosslinking agent, as well as a vulcanizate provided from such a composition.

The following non-limiting, illustrative examples provide detailed conditions and materials that can be useful in the practice of the present invention. These examples employ 1,3-butadiene as an exemplary polyene and styrene as an exemplary vinyl aromatic compound due to a variety of factors including cost, availability, ability to handle and, most importantly, ability to make internal comparisons as well as comparisons against previously reported polymers. The ordinarily skilled artisan can extend these examples to a variety of homo- and interpolymers.

EXAMPLES

In the following examples, the n-butyllithium (n-BuLi) solution is 2.5 M (1.6 M in Example 9) and the 2,2-bis(2'-tetrahydrofuryl)propane (BTHFP) solution is 1.6 M, both in hexane.

Example 1: Functionalized SBR

To a ~19 L (5 gallon) $N_2$-purged reactor equipped with a stirrer were added 3.99 kg hexane, 1.98 kg styrene solution (30.3% (w/w) in hexane), and 5.41 kg 1,3-butadiene solution (20.6% (w/w) in hexane). Thereafter, the reactor was charged with 5.72 mL n-BuLi solution followed by 2.23 mL BTHFP solution before the reactor jacket was heated to 50° C.

The batch temperature peaked at ~80° C. after ~39 minutes.

After an additional ~40 minutes, 3.31 mL ECETMOS was added to the reactor to functionalize the carbanionic polymer chains. After ~30 minutes, 1.31 mL isopropanol was added to quench the polymerization.

A sample of polymer cement was collected ~10 minutes after quenching, with the remaining cement being transferred to a storage vessel. Characteristics of the collected functionalized SBR intermediate are summarized below in Table 2.

Example 2: Hydrogenation

To a ~44 L (11.7 gallon) stirred reactor under $N_2$ atmosphere, 11.43 kg of the functionalized polymer (in hexane) from Example 1 was introduced, followed by 5.315 kg hexane, resulting in a 10.0% (w/w) solution. The reactor was thrice purged with 138 kPa (20 psi) $H_2$ before the reactor jacket was heated to 50° C.

To a $N_2$-purged, dry bottle was added 400 mL hexane and 21.97 mL 1.03 M triethylaluminum, followed by 3.99 mL nickel octoate solution (10.1% (w/w) in hexane), so as to yield a hydrogenation catalyst system (Al/Ni=3.3:1).

The catalyst system was charged to the reactor, which then immediately was pressurized to 517 kPa (75 psi) with $H_2$.

After ~90 minutes, $H_2$ was released from the reactor, and the polymer cement was transferred to a storage vessel. Approximately equal amounts of this polymer cement were transferred into 750 mL pre-massed, $N_2$-purged glass bottles.

The percentage of butadiene mer hydrogenation was determined (by NMR) to be 92%.

Example 3: Low Molecular Weight BR

To a 7.6 L (2 gallon) $N_2$-purged reactor equipped with a stirrer was added 1.23 kg hexane and 3.255 kg 1,3-butadiene solution (20.9% (w/w) in hexane). The reactor was charged with 13.61 mL n-BuLi solution, followed by 0.53 mL BTHFP solution.

The reactor jacket was heated to 57° C., and the batch temperature peaked at ~82° C. after 38 minutes. The reaction mixture was cooled to room temperature after ~60 total minutes of reaction time.

Examples 4-8: Coupling

The polymer products of Examples 2 and 3 were coupled in varying ratios, which are tabulated immediately below. (The ratios were determined based on the amounts of Li: 0.00125 mM/g polymer cement from Example 2 and 0.0075 mM/g polymer cement from Example 3.)

TABLE 1

Addition amounts of polymer cements

|  | 4 | 5 | 6 | 7 | 8 |
|---|---|---|---|---|---|
| Example 2 (g) | 188 | 188 | 190 | 187 | 187 |
| Example 3 (mL) | 25 | 50 | 100 | 200 | 400 |
| Ratio of Ex. 3:Ex. 2 polymers | 1:2 | 1:1 | 2:1 | 4:1 | 8:1 |

The bottles were placed in a 50° C. water bath and agitated for ~90 minutes. The samples then were coagulated in a mixture of isopropanol and butylated hydroxytoluene (BHT). The coagulated polymer samples were drum dried at 120° C.

Characteristics of the polymers from the preceding examples are tabulated below. Molecular weight values (all in kg/mol) of the polymer samples were determined by GPC, with THF as a solvent and calibrated with a series of polystyrene standards. The styrene and 1,2-linkage (vinyl) contents of the polymer samples were determined by NWR spectroscopy, while glass transition temperature ($T_g$) values were determined by DSC.

TABLE 2

Polymer characterization data for Examples 1-8

|  | 1 | 2 | 3 | 4 | 5 | 6 | 7 | 8 |
|---|---|---|---|---|---|---|---|---|
| Peak 1 |  |  |  |  |  |  |  |  |
| $M_n$ | 379 | 406 | 35.2 | 416 | 411 | 422 | 449 | 456 |
| $M_w$ | 414 |  | 36.7 | 497 | 472 | 507 | 512 | 518 |

TABLE 2-continued

Polymer characterization data for Examples 1-8

|  | 1 | 2 | 3 | 4 | 5 | 6 | 7 | 8 |
|---|---|---|---|---|---|---|---|---|
| $M_p$ | 346 |  | 36.8 | 359 | 362 | 365 | 382 | 385 |
| Area (%) Peak 2 | 51 | 54 |  | 40 | 38 | 33 | 24 | 17 |
| $M_n$ | 166 | 168 | n/a | 176 | 177 | 182 | 216 | 221 |
| $M_w$ | 174 | 177 | n/a | 182 | 183 | 188 | 224 | 229 |
| $M_p$ | 176 | 179 | n/a | 182 | 183 | 188 | 229 | 236 |
| Area (%) Peak 3 | 49 | 46 | n/a | 34 | 32 | 28 | 25 | 18 |
| $M_n$ | n/a | n/a | n/a | 73.3 | 73.1 | 72.5 | 79.5 | 81.8 |
| Area (%) Peak 4 | n/a | n/a | n/a | 7 | 10 | 14 | 12 | 10 |
| $M_n$ | n/a | n/a | n/a | 36.1 | 35.0 | 36.0 | 36.0 | 35.9 |
| Area (%) | n/a | n/a | n/a | 19 | 20 | 25 | 38 | 55 |
| styrene (%) | 34.4 | 33.0 | n/a |  |  | 33.9 | 25.5 | 13.6 |
| vinyl (%) | 44.4 | 2 | n/a | 19.7 | 19.8 | 18.5 | 17.9 | 17.4 |
| $T_g$ (C) | n/a | n/a | n/a | −31 | −31 | −32 | −32 | −32 |
|  |  |  |  | −87 | −87 | −87 | −87 | −87 |

Example 9: Low Molecular Weight BR

To a 3.8 L (1 gallon) N$_2$-purged reactor equipped with a stirrer was added 0.806 kg hexane and 1.071 kg 1,3-butadiene solution (24.1% (w/w) in hexane). The reactor was charged with 26.58 mL n-BuLi solution, followed by 5.32 mL BTHFP solution.

The reactor jacket was heated to 57° C., and the reaction was allowed to proceed for 30 minutes.

Example 10. Coupling

To 500 mL of the polymer cement from Example 2 was added 12 mL of the product of Example 9. This provided a equivalents ratio (Ex. 2 to Ex. 9) of 2:1 based on the amounts of Li in each: 0.00125 mM/g polymer cement from Example 2 and 0.01875 mM/g polymer cement from Example 9.

The bottles were placed in a 50° C. water bath and agitated for ~90 minutes. The samples then were coagulated in a mixture of isopropanol and BHT. The coagulated polymer samples were drum dried at 120° C.

Characteristics of the product of the coupling reaction are tabulated below, with each of the units as described above and characteristics having been determined as described above.

TABLE 3

Polymer characterization data for polymers in Examples 9-10

|  | 9 | 10 |
|---|---|---|
| Peak 1 |  |  |
| $M_n$ | n/a | 433 |
| $M_w$ | n/a | 509 |
| $M_p$ | n/a | 372 |
| Area (%) | n/a | 55 |
| Peak 2 |  |  |
| $M_n$ | 13.4 | 182 |
| $M_w$ | 14.3 | 190 |
| $M_p$ | 14.4 | 192 |

Examples 11-13: Rubber Compounds and Vulcanizates

An unfilled rubber composition formulation containing wax, antioxidants, accelerators, curing agents, etc., was used to prepare three rubber compounds, differing only in the nature and amounts of polymers included (with Ex. 11 being a comparative):

Ex. 11—50 pbw high-cis BR and 50 pbw Ex 2 polymer
Ex. 12—45 pbw high-cis BR and 55 pbw Ex. 10 polymer
Ex. 13—45 pbw high-cis BR, 49.5 pbw Ex. 2 polymer and 5.5 pbw Ex. 10 polymer Each formulation included masterbatch and final mixing stages, and each compound was subjected to a standard curing time and temperature combination.

Stress at break and toughness of the resulting vulcanizates were evaluated at both room temperature (RT, ~22° C.) and 100° C., with the results being tabulated immediately below.

TABLE 4

Tensile properties of vulcanizates

|  | Stress at break (MPa) | | Toughness (MPa) | |
|---|---|---|---|---|
|  | RT | 100° C. | RT | 100° C. |
| 11 | 3.1 | 1.7 | 3.3 | 1.8 |
| 12 | 2.6 | 1.9 | 3.6 | 2.3 |
| 13 | 3.2 | 2.5 | 4.7 | 3.0 |

From the foregoing, one can see use of an Example 10-type polymer as an additive (e.g., at 5 phr) provides improved tensile properties, whereas its use as a direct replacement for a functionalized 1H-SBR results in essentially equivalent properties.

For the vulcanizates of Examples 11 and 12, tan δ was plotted against temperature over a range of −120° to ~100° C. Comparing peaks of the two vulcanizates in the range of about −80° C. to −100° C. showed that the peak of the Example 12 vulcanizate was both reduced and shifted by roughly +3° C., both of which indicate that miscibility between the high-cis BR and the H-SBR improved when the latter included a grafted BR segment.

The improved miscibility was confirmed by transmission electron microscopy, where images indicated that the Example 12 vulcanizate had domains which were less discrete than those of the Example 11 vulcanizate, as well as overall better polymer mixing.

That which is claimed is:

1. A functionalized macromolecule comprising a hydrogenated interpolymer portion, a non-hydrogenated polymer portion, and a functional group covalently bonded to each of said portions, said functional group exhibiting interactivity with silica.

2. The functionalized macromolecule of claim 1 wherein said functional group is a radical of a compound that comprises both an epoxy group and a siloxy group.

3. The functionalized macromolecule of claim 2 wherein said compound is a 2-(3,4-epoxycyclohexyl) ethyltrialkoxysilane, said alkoxy moieties optionally being methoxy moieties.

4. The functionalized macromolecule of any of claim 1 wherein said interpolymer comprises vinyl aromatic mer and conjugated diene mer.

5. The functionalized macromolecule of claim 4 wherein at least 80 mole percent of said conjugated diene mer in said interpolymer are hydrogenated.

6. The functionalized macromolecule of claim 5 wherein at least 90 mole percent of said conjugated diene mer in said interpolymer are hydrogenated.

7. The functionalized macromolecule of claim 4 wherein said interpolymer comprises from 10 to 45 mole percent styrene mer.

8. The functionalized macromolecule of claim 4 wherein a majority of said conjugated diene mer are incorporated in a 1,2-vinyl configuration.

9. The functionalized macromolecule of claim 1 wherein said non-hydrogenated polymer portion consists of conjugated diene mer.

10. The functionalized macromolecule of claim 1 wherein said macromolecule comprises multiple non-hydrogenated polymer portions.

11. The functionalized macromolecule of any of claim 1 wherein said non-hydrogenated polymer portion results from a conjugated diene homopolymer having a number average molecular weight of from 5 to 50 kg/mol.

12. The functionalized macromolecule of claim 11 wherein said conjugated diene homopolymer has a number average molecular weight of from 10 to 20 kg/mol.

13. The functionalized macromolecule of claim 11 wherein said conjugated diene homopolymer has a number average molecular weight of from 30 to 40 kg/mol.

14. A composition comprising:
    functionalized macromolecule comprising a hydrogenated interpolymer portion, a nonhydrogenated polymer portion, and a functional group covalently bonded to each of said portions, said functional group exhibiting interactivity with silica; and
    at least one bulk rubber,
    said at least one bulk rubber optionally comprising polybutadiene, and optionally silica.

15. The composition of claim 14 wherein said composition comprises at least one polybutadiene having at least 90% of its mer in a cis configuration.

16. A method for providing a functionalized macromolecule that comprises hydrogenated interpolymer and non-hydrogenated polymer portions, said method comprising:
    a) providing a terminally functionalized interpolymer that comprises
        1) vinyl aromatic mer,
        2) conjugated diene mer,
        3) hydrogenated products of conjugated diene mer, and
        4) a terminal functionality which is reactive toward carbanions and comprises a functional group capable of interacting with silica;
    b) introducing said interpolymer to, or introducing to said interpolymer, a carbanionic polymer that comprises conjugated diene mer, said carbanionic polymer optionally having a number average molecular weight of from 5 to 50 kg/mol; and
    c) allowing said carbanionic polymer to react with said terminal functionality so as to provide said functionalized macromolecule.

17. The method of claim 16 wherein said interpolymer is provided by subjecting a terminally functionalized polymer that comprises vinyl aromatic mer and conjugated diene mer to hydrogenation conditions so as to hydrogenate at least 50 mole percent of said conjugated diene mer.

18. The method of claim 17 wherein at least 80 mole percent of said conjugated diene mer have been hydrogenated.

19. The method of claim 16 wherein at least one of the following is true:
    said interpolymer comprises from 10 to 45 mole percent styrene mer, and a majority of said conjugated diene mer are incorporated in a 1,2-vinyl configuration.

20. The method of claim 16 wherein from 0.5 to 10 equivalents of said carbanionic polymer are reacted per equivalent of said interpolymer.

* * * * *